US006075532A

United States Patent [19]

Colleran et al.

[11] Patent Number: 6,075,532

[45] Date of Patent: Jun. 13, 2000

[54] EFFICIENT REDRAWING OF ANIMATED WINDOWS

[75] Inventors: John D. Colleran; Vadim Gorokhovsky, both of Redmond, Wash.

[73] Assignee: Microsoft Corporation, Redmond, Wash.

[21] Appl. No.: 09/046,394

[22] Filed: Mar. 23, 1998

[51] Int. Cl.[7] .......... G06F 3/14

[52] U.S. Cl. .......... 345/340; 345/473

[58] Field of Search .......... 345/340, 342, 345/343, 344, 345, 434, 435, 473, 113, 114, 118

[56] References Cited

U.S. PATENT DOCUMENTS

| | | | |
|---|---|---|---|
| 5,276,437 | 1/1994 | Horvath et al. | 345/340 |
| 5,363,483 | 11/1994 | Jones et al. | 345/433 |
| 5,555,368 | 9/1996 | Orton et al. | 345/344 |
| 5,657,462 | 8/1997 | Brouwer et al. | 345/336 |
| 5,877,762 | 3/1999 | Young | 345/344 |
| 5,920,325 | 7/1999 | Morgan et al. | 345/473 |

*Primary Examiner*—Crescelle N. dela Torre
*Attorney, Agent, or Firm*—Christensen O'Connor Johnson & Kindness

[57] ABSTRACT

A method, system and computer program product for repainting the image uncovered by a character of an animated sequence on a desktop in a windows-based operating system. Before a character in a frame of an animated sequence is displayed, a boundary box is specified. Then, a bitmap of the image within the area enclosed by the boundary box is stored and the character in the frame of the animated character is displayed. Next, the area within the boundary box that is exposed by the next frame of the character's animated sequence is determined, the image area from the stored bitmap that corresponds to the area exposed within the boundary box is copied, the display is painted with the copied image area, and character in the next frame of the animated sequence is displayed. If the character in the next frame of the animated sequence is outside the current boundary box, a new boundary box is specified by maintaining the bitmap image common to the current and the next frame's boundary box and adding the image of the new boundary box not included in the current boundary box to the stored bitmap image.

12 Claims, 6 Drawing Sheets

EFFICIENT REDRAWING OF ANIMATED WINDOWS

FIELD OF THE INVENTION

This invention relates to methods, systems and computer products for display regeneration and, more particularly, methods, systems and computer products for efficiently redrawing a display that includes animated characters.

BACKGROUND OF THE INVENTION

While, as will be understood from the following description, the present invention was developed for efficient redrawing of displayed areas around an animated character displayed on a desktop of a windows-based operating system, it is to be understood that the invention can also be used in other environments.

It is now common for operating systems to have a shell that provides a graphical user interface (GUI). The shell is a piece of software (either a separate program or component part of the operating system) that provides direct communication between the user and the operating system. The GUI typically provides a graphical icon-oriented and/or menu driven environment for the user to interact with the operating system.

The GUI of many operating system shells is based on a desktop metaphor. More specifically, the GUI is intended to create a graphical environment which simulates working at a desk. These GUIs typically employ a windowing environment with a desktop. The windowing environment presents the user with specially delineated areas of the screen called windows, each of which is dedicated to a particular application program. Each window can act independently, as if it were a virtual display device under control of its particular application program. Windows can typically be resized, moved around the display, and stacked so as to overlay another. In some windowing environments, windows can be minimized to an icon or increased to a full-screen display. Usually, the windows have a top-to-bottom order in which they are displayed, with the top window at a particular location on the screen overlaying any other window at that same location. The top-most window has the "focus" and accepts the user's input. The user can switch other windows to the top by clicking with a mouse or other pointer device, or by inputting certain key combinations. This allows the user to work with multiple application programs in a manner similar to physically working with multiple paper documents arbitrarily stacked or arranged on an actual desk.

The desktop of the graphical user interface is a screen display containing images of icons, active and inactive application programs displayed in windows on the desktop image. An active application program is an application program that frequently regenerates the image displayed in its window because events associated with the program frequently change. Each time an event changes the window associated with the program, the window must be regenerated. Examples of active application programs are programs that collect data and control a clock or stock ticker tape display. Inactive application programs are programs that do not require the frequent regeneration of the image displayed in their window. A word processing or spreadsheet program displaying a document in its associated window is an example of an inactive program. Such programs become active when they begin automatically scrolling the displayed image or present new display screens.

The desktop may present windows associated with user help application programs. A user help application program may present within its associated window instructional text or an animation sequence of a character. Because animated characters have proven to be an effective user friendly tool for guiding and teaching users, animators and application educators have been seeking ways to improve upon their effectiveness. One way animators and application educators have found is to free the animated character from the confines of a window, thereby allowing the character to more positively interact with windows or other items displayed on the desktop.

Despite the noted interactive advantage, there exists some conflict between freely moving interactive characters and present display techniques that reduce the effectiveness of each. In present windowing environments whatever is displayed is stored in a single layer memory space. For example, if a first window of an inactive program overlays a portion of a second window of an inactive program, the portion of the second window covered is not stored, only what is displayed is stored. If the first window is moved or deleted, thereby exposing the covered portion of the second window, the operating system requests the application program running in the second window to regenerate or repaint the portion of the second window that was previously covered. However, repainting even a small portion of a window may cause an application to recalculate its internal state and possibly require a repainting of the entire window.

Active application program window repainting is not an issue with respect to unconfined animated characters, because operating systems are always requesting active application program windows to repaint themselves, regardless of what is displayed on or around them. In contrast, repainting of inactive application program windows is an issue with respect to unconfined animated characters. An unconfined animated character will uncover a small portion of the windows or desktop the character overlays each time the character changes position. Frames of an animated sequence are generated at approximately 10–12 frames per second. If each successive frame of a character animated sequence uncovers just a pixel of an inactive application program window, in the past, the operating system was required to request that the inactive application program perform a repaint at a rate of 10–12 times per second. Present systems are unable to efficiently execute window repaints at this rate. The result is an annoying display flicker and greatly reduced operating system performance.

The present invention is directed to overcoming the foregoing and other disadvantages. More specifically, the present invention is directed to providing a method, system and computer product for improving the efficiency of redrawing of unconfined animated characters on a desktop in a windows-based operating system.

SUMMARY OF THE INVENTION

In accordance with this invention, a method, system and computer program product for repainting the image on a desktop uncovered by the movement of a character of an animated sequence is provided. Before a frame of the animated character sequence is displayed, a boundary box is specified. Then, a bitmap image of the image within the area enclosed by the boundary box is stored and the frame of the animated character sequence is displayed. Next, the area within the boundary box that is exposed when the character moves to a different position in the next frame of the animated character sequence is determined. Then the information from the stored bitmap that corresponds to the areas exposed within the boundary box is extracted or copied. The display is then painted or updated with the extracted information; and, in the next frame of the animated sequence is displayed.

In accordance with other aspects of this invention, if the boundary box overlaps an active application program window, the overlap area is subtracted from the stored bitmap. The overlap area is repainted when the corresponding active application program repaints its entire window.

In accordance with still other aspects of this invention, if the next frame of the animated character sequence places any portion of the animated character outside the current boundary box, a new boundary box is specified for the next frame of the animated character sequence by maintaining the bitmap image common to the current and the new boundary box and adding the image of the new boundary box not included in the current boundary box.

As will be readily appreciated from the foregoing summary, the invention provides a new and improved method, system and computer product for redrawing of areas uncovered by animated characters on a desktop in a windows-based operating system.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
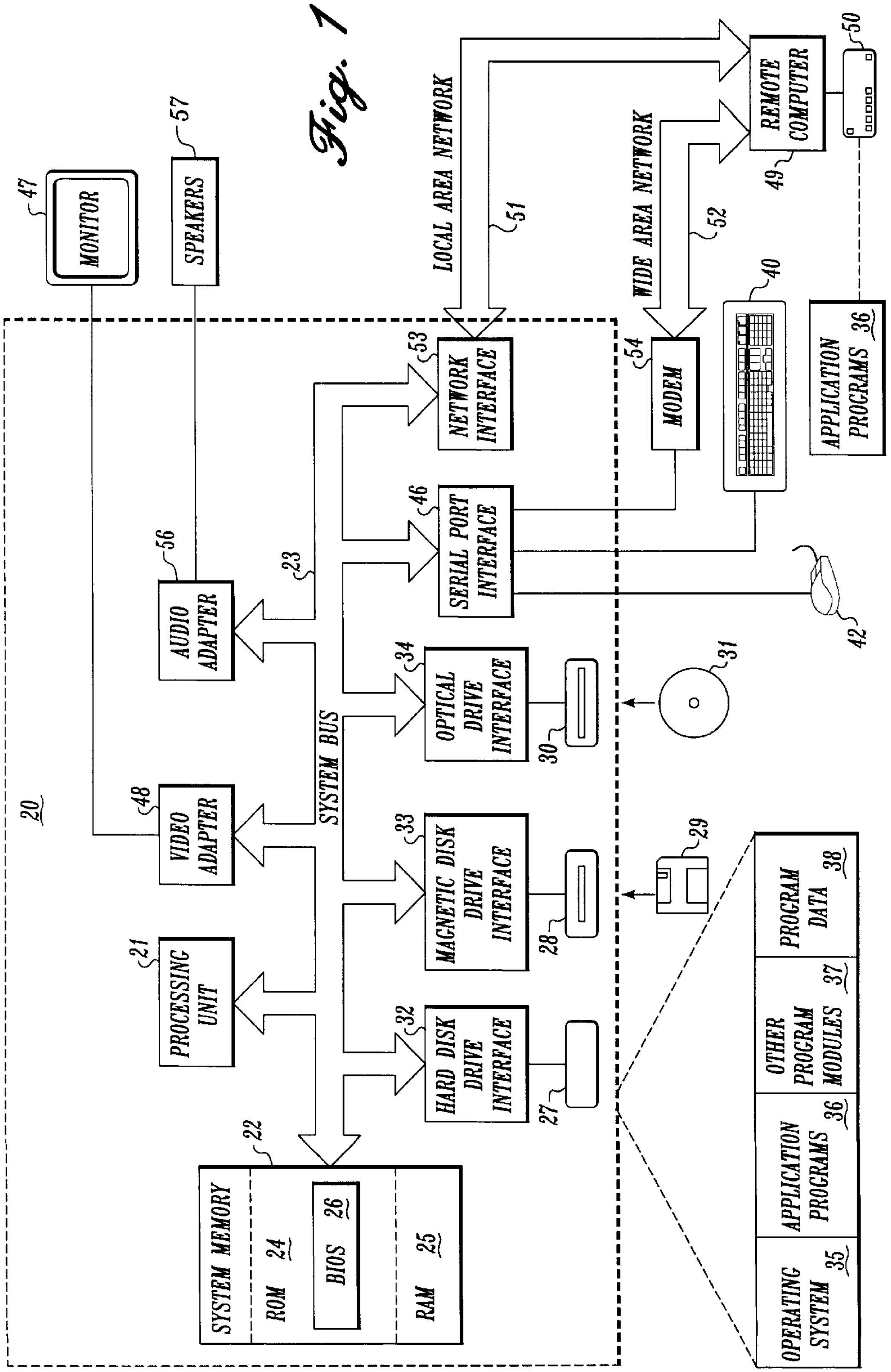
FIG. 1 is a block diagram of a general purpose computer system for implementing the present invention.

In accordance with the present invention, an efficient windows redrawing program executes on a computer, preferably a general purpose personal computer. FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, characters, components, data structures, etc., that perform particular tasks or implement particular abstract data types. As those skilled in the art will appreciate, the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29, and a removable optical disk 31, it should be appreciated by those skilled in the art that other types of computer-readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A display 47 is also connected to the system bus 23 via an interface, such as a video adapter 48. One or more speakers 57 may also be connected to the system bus 23 via an interface, such as an audio adapter 56. In addition to the display and speakers, personal computers typically include other peripheral output devices (not shown), such as printers.

The personal computer 20 may operate in a networked environment using logical connections to one or more personal computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20 or portions thereof, may be stored in the remote memory storage device. It will be appreciated that the network connections shown are exemplary and other means of establishing a communications link between the computers may be used.

The present invention, implemented on a system of the type illustrated in FIG. 1 and described above, improves the efficiency of redrawing of unconfined animated characters, i.e., characters not confined by a window displayed on the display 47. In this regard, the operating system 35 is a windows-based operating system that provides a graphical user interface on display 47. The graphical user interface includes images of icons, active and inactive application programs. The image displayed in the window of an active application program is frequently regenerated because events associated with active application programs frequently change. Each time an event changes, the window associated with the related active application program is repainted. Examples of active application programs are programs that collect data and control a clock or stock ticker tape display. Inactive programs are application programs that do not require the frequent regeneration of their window image. For example, a word processing or spreadsheet program is an inactive program until the program receives an input that requires the image displayed in the program's window to change. Because operating systems are continuously requesting active application programs to repaint their associated windows regardless of what is displayed on or around them, active application programs do not present a problem when their associated windows are uncovered by changes in the position of a character from frame to frame in an animated character sequence. In contrast, inactive application programs do present a problem when their associated windows are uncovered by changes in the position of a character from frame to frame in an animated character sequence. A problem occurs because each time even one pixel of an inactive application program window is uncovered, in the past, the entire window or part of the window was required to be repainted by the inactive application program. Since animated character sequence frames occur at 10–12 frames per second, an inactive application program could be requested to repaint the uncovered portion of the window at the rate of 10–12 times per second. Such a requirement can overload the capabilities of some contemporary computer systems, resulting in annoying display flicker. The present invention is directed to overcoming this problem.

As can be readily appreciated by those of ordinary skill in the art of application programs, the terms active and inactive application programs are not commonly referred to terms in the art but are used in the description of the present invention to provide clarity. Using a more conventional understanding of active and inactive application programs, if an application program draws into a bitmap stored by the operating system for the animated sequence, the operating system is able to subtract out the application program areas and only restore the subtracted out portions that the system determines are unaffected.

Figure 2A:
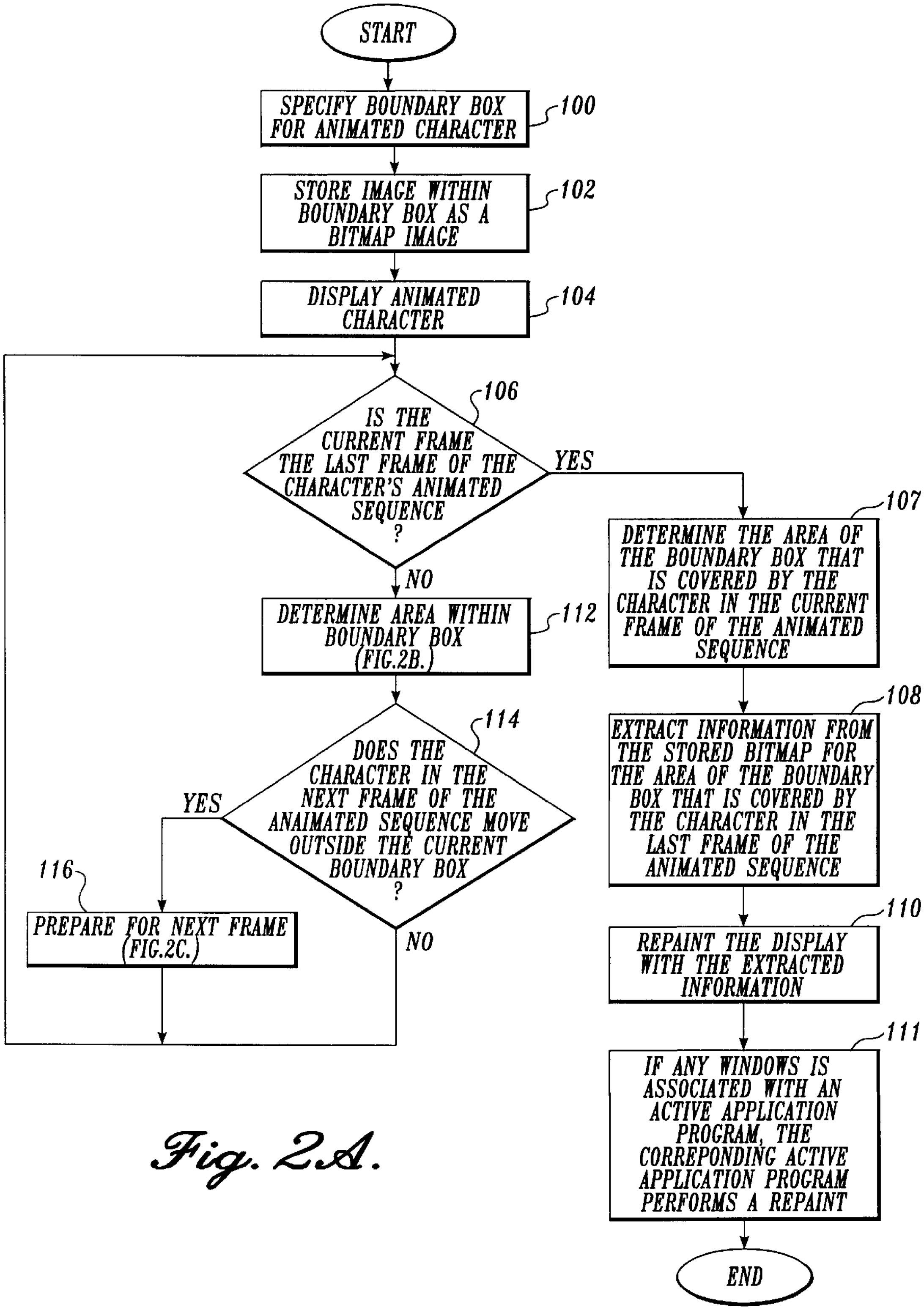
FIGS. 2A–2C are flow diagrams illustrating the process of the invention for efficiently redrawing areas uncovered by subsequent frames of an animated character on a desktop in a windows-based operating system.
Figure 2B:
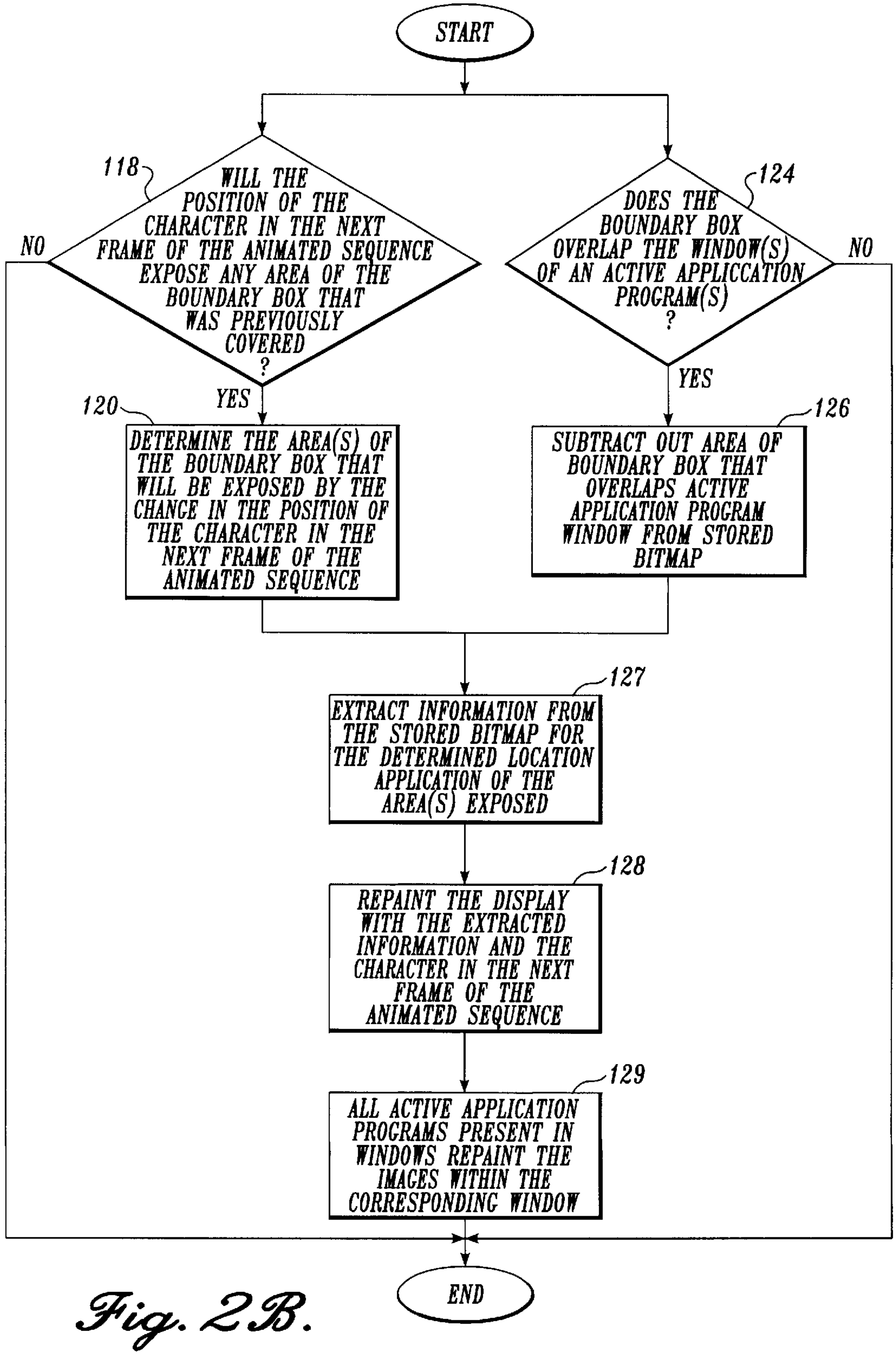
Figure 2C:
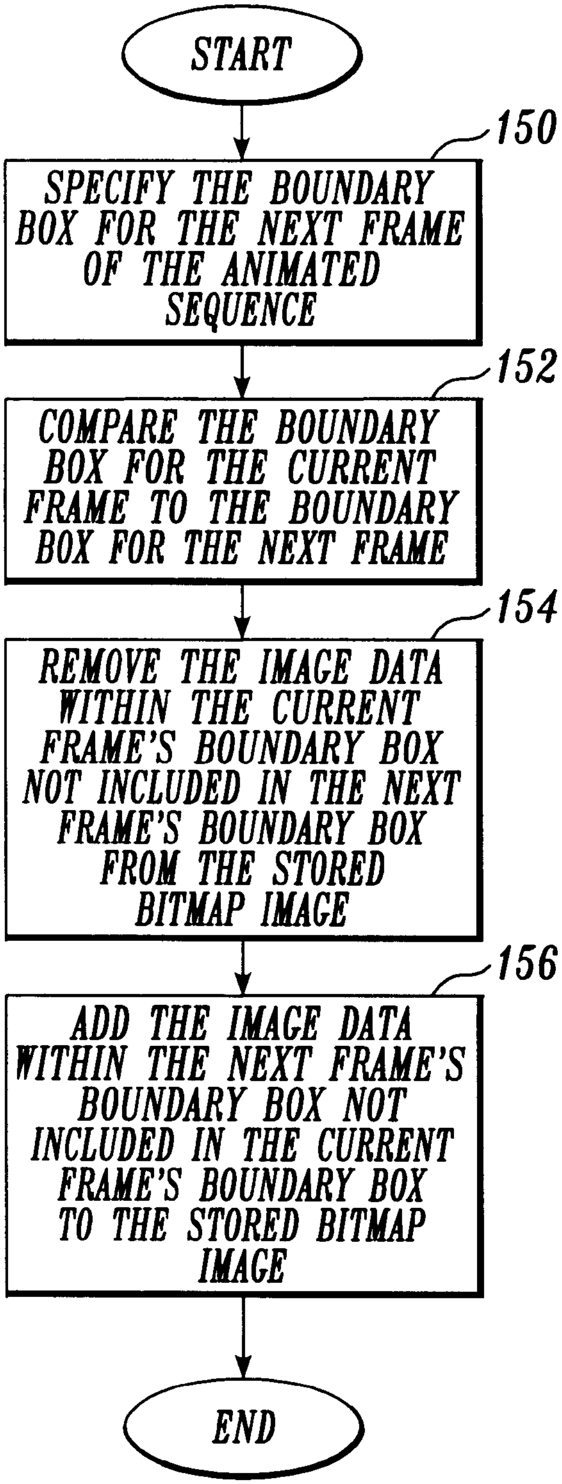

FIGS. 2A–2C are diagrams illustrating the inventive process for efficiently redrawing areas on a display uncovered by an unconfined or unwindowed character in successive frames of an animated character sequence. First, as shown at block 100, in FIG. 2A, the dimensions of a boundary box that is large enough to encompass the to-be-displayed animated character is specified. The specified boundary box is a description of an area of the desktop that will contain the animated character. The boundary box is preferably rectangular in shape. Then, at block 102, the portion of the displayed image that lies within the dimensions of the specified boundary box is stored as a bitmap. The bitmap image may include images of icons, the windows of active and inactive application programs displayed on the desktop, and the desktop. As noted above, an active application program is an application program that frequently regenerates the image displayed in its associated window as events change. An inactive application program is an application program that does not frequently regenerate window images. Inactive programs become active when they begin to cause frequent image changes. For example, a word processing program shifts from inactive to active when it is required to scroll displayed test and images.

Next, at block 104, the first frame of an animated character sequence is displayed on the desktop. The animated character and any other images within the frame are displayed on top of all other displayed items. In present windowing systems the animated character appears on top when its associated application program is in the focus or foreground window of the desktop.

At decision block 106, the process determines if the currently displayed frame of the animated character sequence is the last frame of the animated character sequence. If the currently displayed frame is the last frame of the sequence, the area of the boundary box that is covered by the character in the last frame is determined. See block 107. This is the area that will be uncovered or exposed when the animated sequence ends. Next, at block 108, the image (pixel(s)) for the area of the boundary box that is covered by the character in the last frame of the animated character sequence is extracted or copied from the stored bitmap. At block 110, the area within the boundary box that is covered by the character in the last frame of the animated sequence is repainted with the extracted or copied image. Then, at block 111, if any active application windows on the desktop will be uncovered when the animated sequence ends, the associated active application program(s) is requested by the operating system to repaint its window.

If, at decision block 106, the current frame is not the last frame of the animated sequence, the process determines what area of the boundary box. See block 112. How this is accomplished is shown in FIG. 2B and described below. At decision block 114, the process determines if any part of the character in the next frame of the animated character sequence will be located outside of the current boundary box. If the character of the next frame of the animated sequence does not move outside of the current boundary box, the process returns to decision block 106. However, if the character of the next frame does move outside of the current boundary box, the process prepares for processing of the next frame. See block 116. Next frame preparation is illustrated in FIG. 2C and described below.

FIG. 2B illustrates the process performed in block 112 of FIG. 2A. At decision block 118, the operating system determines if any area within the boundary box that is covered by the character of the present frame of the animated character sequence will be uncovered or exposed when the next frame of the animated character sequence is displayed. In other words, the operating system determines if the position of the animated character changes in the next frame. The present invention's primary concern is for effectively dealing with exposed image of the desktop and windows associated with inactive application programs. If an area covered by the position of the character in the current frame will be uncovered by the position of the character in the next frame of the animated character sequence, the location of the to-be-uncovered area within the boundary box is determined. See block 120. If no area will be uncovered, repainting of exposed areas within the boundary box does not occur.

Because windows associated with active application programs are regularly regenerated by the active application programs at the request of the operating system, the process handles areas of the boundary box that overlap the windows active application programs different than areas of the boundary box that overlap windows of inactive application programs. In this regard, as shown in FIG. 2B, simultaneously with determining whether windows associated with inactive application programs, icons and the desktop located within the boundary box are to be uncovered by the change in the position of the character in the next frame, the process determines if the boundary box overlaps a window associated with an active application program. See decision block 124. Specifically, the area encompassed by the boundary box is checked to see if any portion overlaps part or all of a window associated with an active application program. This is accomplished by comparing the boundary of the boundary box with the boundaries of all the windows associated with active application programs. If the comparison reveals any area of overlap, the area of the active application window that lies within the boundary box is subtracted out of the stored bitmap. See block 126. If no active application program windows are overlapped by the boundary box, the process of compensating for an active application program does not occur.

After completion of blocks 120 and 126, the image for the to-be-uncovered area is extracted or copied from the stored bitmap. See block 127. Then, at block 128, the display is repainted with the extracted or copied image and the next frame of the animated character sequence. At block 129, all active application programs present in windows on the desktop, at the request of the operating system, repaint the entire image within their associated window regardless of whether any area was exposed by the character in the next frame of the animated sequence or the boundary box overlapped an active application window.

The result of the above process is that inactive application programs are not requested to repaint the image within their respective windows every time the character of an animated sequence uncovers an area within the window of an inactive application program. The retrieval and repainting of an uncovered image from the stored bitmap image is, by comparison, very small compared to repainting all or part of the inactive application program windows. As a result, the work to restore the uncovered bits is done in the context of the animation sequence application from the pre-saved bitmap, therefore no context switches are necessary and the work of recalculating and repainting uncovered areas is avoided.

FIG. 2C illustrates the process performed in block 116 of FIG. 2A. When, at decision block 114 of FIG. 2A, the process determines that the character in the next frame of the animated sequence moves outside the current boundary box, the boundary box for the next frame of the animated sequence is specified. See block 150. At block 152, the boundary box for the current frame is compared to the boundary box specified for the next frame of the animated sequence. Next, at block 154, the image within the current frame's boundary box not included in the next frame's boundary box is removed from the stored bitmap image. At block 156, the image within the next frame's boundary box not included in the current frame's boundary box is added to the stored bitmap image. Since the character in most animated sequences have subtle movements and do not move very far from the previous position, a significant portion of the image that appears behind the animated character is maintained in the stored bitmap. Because no area of the boundary box needs to be continually restored, processing work is reduced.

The process described in FIG. 2C above may also be performed another way. In another embodiment of specifying a new boundary box, the animating window is briefly hidden then the animating window is shown in the new boundary box. No algorithm is performed to acquire the new boundary box.

As will be readily appreciated by those of ordinary skill in the art of desktop and window displays, the displayed images outside the specified boundary box are displayed, and repainting if required, according to current display techniques.

Figure 3:
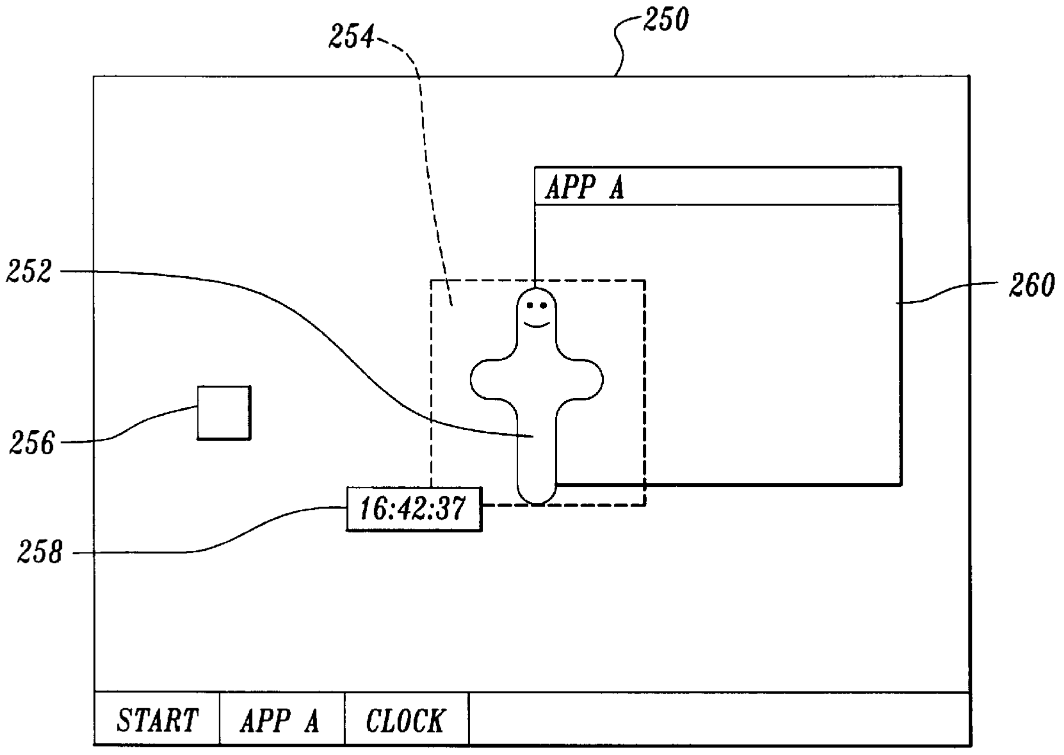
FIG. 3 is a screen shot of an animated character interacting with the windows of active and inactive application programs on the desktop of a windows-based operating system.
Figure 4:
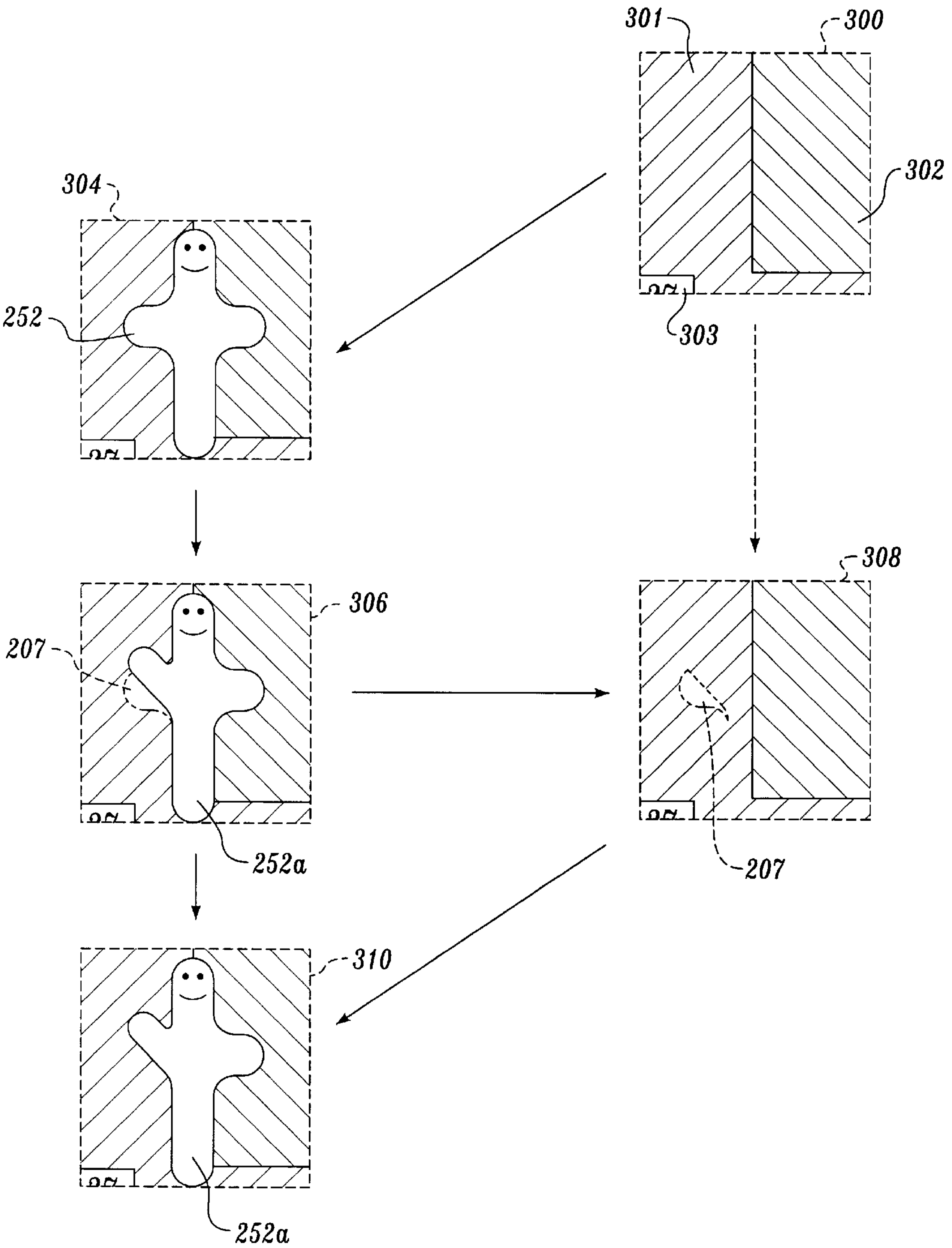
FIG. 4 is a diagram illustrating how the boundary box changes as the animated character illustrated in FIG. 3 changes from one frame to the next.

FIGS. 3 and 4 are an illustrative example of the process shown in FIG. 2. FIG. 3 is a screen shot of a desktop 250 presented on a display device connected to a CPU that is executing a windows-based operating system. In this example, an icon 256 and two windows 258 and 260 associated with running application programs are displayed on the desktop 250. The application program associated with window 258 is an active program specifically, a program controlling a clock display. The application program associated with window 260 is an inactive application program designated APP A. Overlapping the windows 258 and 260 is the animated character 252 of an animated character sequence. The dotted boundary box 254 shown around the character 252 is the prespecified boundary box for the displayed character 252. The outline of boundary box 254 is not viewable on the desktop 250.

FIG. 4 illustrates how the character 252 and the image within the boundary box 254, shown in FIG. 3, are initially presented for display and presented for display after a second frame of the animated character's animated sequence exposes an area of the image within the boundary box that was previously covered. Prior to any display of the character 252, as shown by the dotted rectangle 300 located on the upper right side of FIG. 4, the dimensions of boundary box 254 are specified based on the to-be-displayed first frame of the animated character's animated sequence. Then, the image within boundary box 254, i.e., within the dotted rectangle, is retrieved or copied from the desktop and stored as a bitmap image. The copied and stored image includes a desktop portion 301, an APP A window portion 302, and a clock window portion 303. Next, the first frame of the animated sequence of the animated character 252 is displayed on desktop 250. Dotted rectangle 304 located on the upper left side illustrates how the character from the first frame of the animated sequence is displayed over the presently displayed image. Since the character in the first frame of the animated sequence is painted or rendered over the displayed desktop image, no other rendering is required at this time. Dotted rectangle 306 illustrates that the animated character 252*a* in the next frame of the animated sequence exhibits an arm movement. As described above, the process determines that the arm movement will uncover some previously covered image area (pixels) 207 located within the boundary box 254. Concurrently, a determination is made if there is any image area within boundary box 254 that includes active application programs. In this example, the process determines that clock portion 303 is the only active application program within boundary box 254. The clock portion 303 is subtracted out of the stored bitmap image. Next, the stored bitmap area that corresponds to the uncovered image area is retrieved or copied, as shown at dotted rectangle 308.

Then, at dotted rectangle 310, the image retrieved from the bitmap that corresponds to the uncovered area is painted to its corresponding location on the desktop, the clock application program repaints the image within window 258 and the animated character of the next frame of the animated sequence is displayed on top of the desktop image. Since only a minimal amount of stored bitmap image is retrieved and repainted, minimal processing is required to preserve real-time generation of the animated character sequence, eliminating annoying display flicker.

While the preferred embodiment of the invention has been illustrated and described, it will be appreciated that various changes can be made therein without departing from the spirit and scope of the invention as defined by the appended claims.

The embodiments of the invention in which an exclusive property or privilege is claimed are defined as follows:

1. A method for repainting the image on a desktop uncovered by the movement of a character of an animated character sequence, said method comprising:

specifying a boundary box enclosing an area of a desktop image that will include the character in a frame of the animated character sequence;

storing a bitmap of the portion of the desktop image located within the area enclosed by the boundary box behind the location where the animated character is displayed;

displaying the animated character;

determining the area within the boundary box exposed by a change in the position of the character in the next frame of the animated character sequence;

extracting information from the stored bitmap associated only with the exposed area within the boundary box;

painting the desktop using the extracted information; and displaying the character in the next frame of the animated character sequence.

2. The method of claim 1, further comprising:

determining if any area within the boundary box is a window on the desktop that includes an active application program; and subtracting from the stored bitmap the image that corresponds to the determined area within the boundary box that includes an active application program.

3. The method of claim 1, further comprising:

determining if a portion of the character in the next frame of the animated sequence is outside the current boundary box; and specifying a new boundary box for the character of the next frame of the animated sequence by maintaining the bitmap image common to the current and the new boundary box and adding the image of the new boundary box not included in the current boundary box to the stored bitmap image.

4. A computer program product for performing the method steps of claim 1.

5. A computer program product for performing the method steps of claim 2.

6. A computer program product for performing the method steps of claim 3.

7. A computer-readable medium having computer-executable components for repainting the image on a desktop uncovered by a character of an animated character sequence, said computer-readable medium comprising:

a boundary box component for specifying a boundary box enclosing an area of a desktop image that will include the character in the frame of the animated character sequence;

a memory component for storing a bitmap of the portion of the desktop image located within the area enclosed by the boundary box behind the location where the animated character is displayed;

a first display component for generating a display of the animated character;

a first processing component for determining the area within the boundary box exposed by a change in the position of the character in the next frame of the animated character sequence;

a second processing component for extracting information from the stored bitmap associated only with the exposed area within the boundary box;

a second display component for generating an image based on the extracted information; and a third display component for generating a display of the character in the next frame of the animated character sequence.

8. The computer-readable medium of claim 7, further comprising:

a third processing component for determining if any area within the boundary box is a window on the desktop that includes at least one active application program; and a subtracting component for subtracting from the stored bitmap the image that corresponds to the determined area within the boundary box that includes an active application program.

9. The computer-readable medium of claim 7, further comprising:

a fourth processing component for determining if any portion of the character in the next frame of the animated sequence is outside the current boundary box; and wherein the boundary box component further specifies a new boundary box for the next frame of the animated sequence by maintaining the bitmap image common to the current and the new boundary box and adding the image of the new boundary box not included in the current boundary box to the stored bitmap image.

10. A computer system for repainting the image uncovered by a character of an animated sequence, said computer system comprising:

a processor;

a memory;

a display device for displaying the image generated by at least one application program and the character of the animated sequence; and a computer program stored in the memory and executed by the processor comprises:

a boundary box component for specifying a boundary box enclosing an area of a desktop image that will include the character in a frame of the animated sequence;

a memory component for storing a bitmap image of the area enclosed by the boundary box behind the location where the animated character is displayed;

a first display component for generating a display of the animated character;

a first processing component for determining the area within the boundary box exposed by a change in the position of the character in the next frame of the animated sequence;

a second processing component for extracting information from the stored bitmap associated only with the exposed area within the boundary box;

a second display component for generating an image based on the extracted information; and a third display component for generating a display of the character in the next frame of the animated character sequence.

11. The computer system of claim 10, wherein said computer program further comprises:

a third processing component for determining if any area within the boundary box is a window on the desktop that includes at least one active application program; and a subtracting component for subtracting from the stored bitmap the image that corresponds to the determined area within the boundary box that includes an active application program.

12. The computer system of claim 10, wherein said computer program further comprises:

a fourth processing component for determining if any portion of the character in the next frame of the animated sequence is outside the current boundary box; and wherein the boundary box component further specifies a new boundary box for the next frame of the animated sequence by maintaining the bitmap image common to the current and the new boundary box and adding the image of the new boundary box not included in the current boundary box to the stored bitmap image.

* * * * *